Nov. 19, 1935.  J. KOSMAN  2,021,257
BELT CONVEYER FOR OVENS
Filed Aug. 28, 1933   3 Sheets-Sheet 1
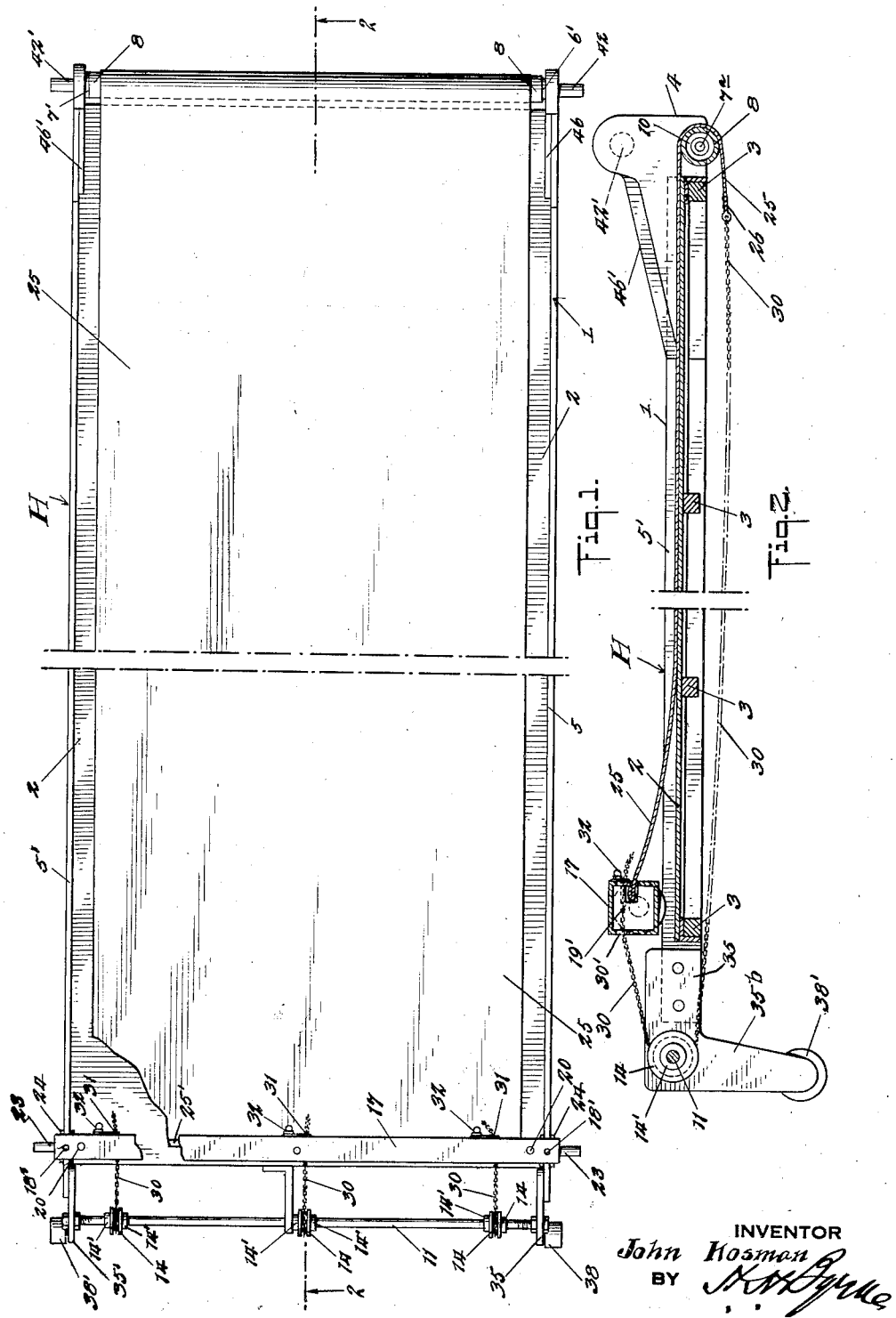
INVENTOR
John Kosman
BY
ATTORNEY Nov. 19, 1935.  J. KOSMAN  2,021,257
BELT CONVEYER FOR OVENS
Filed Aug. 23, 1933  3 Sheets-Sheet 2
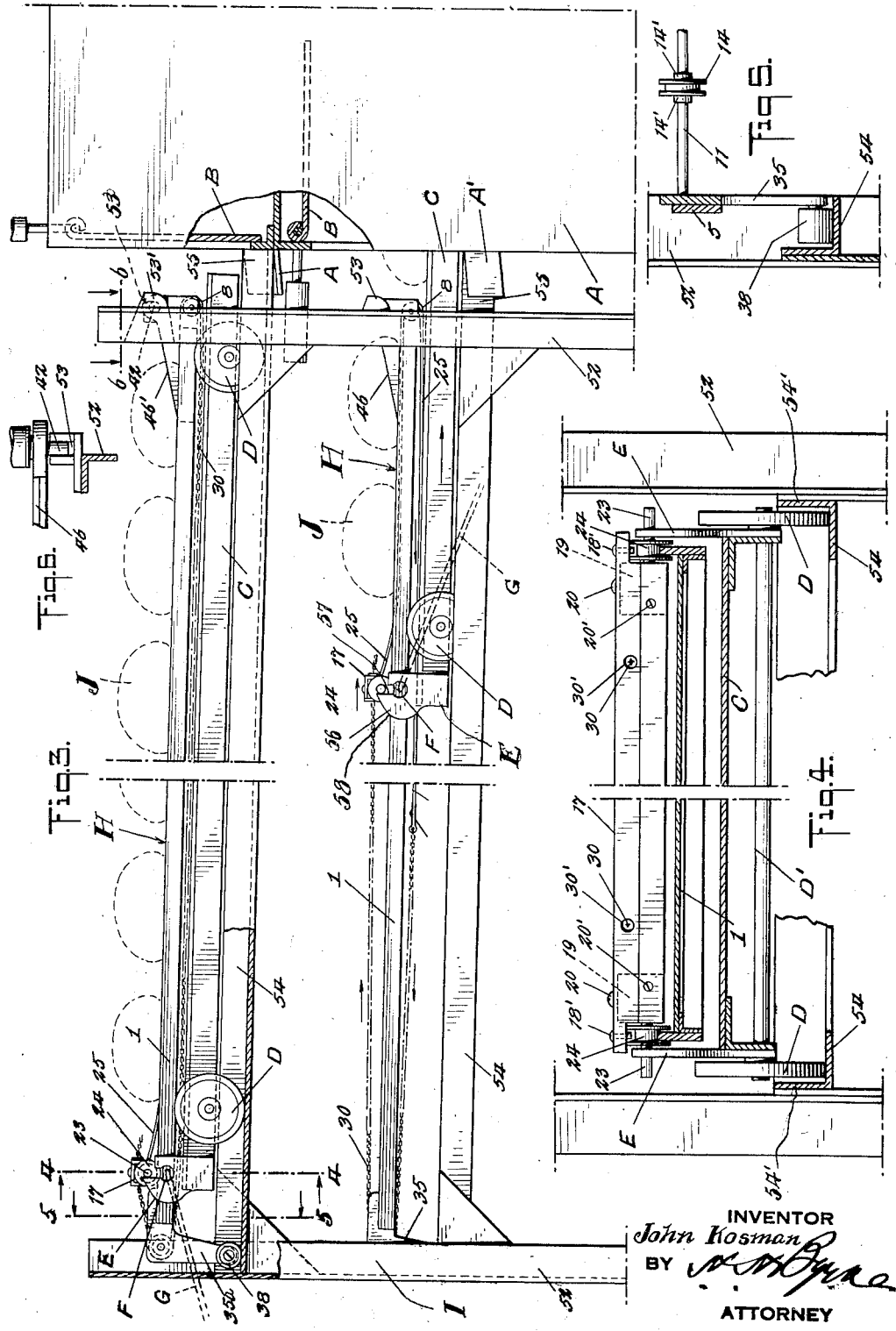
INVENTOR
John Kosman
BY
ATTORNEY

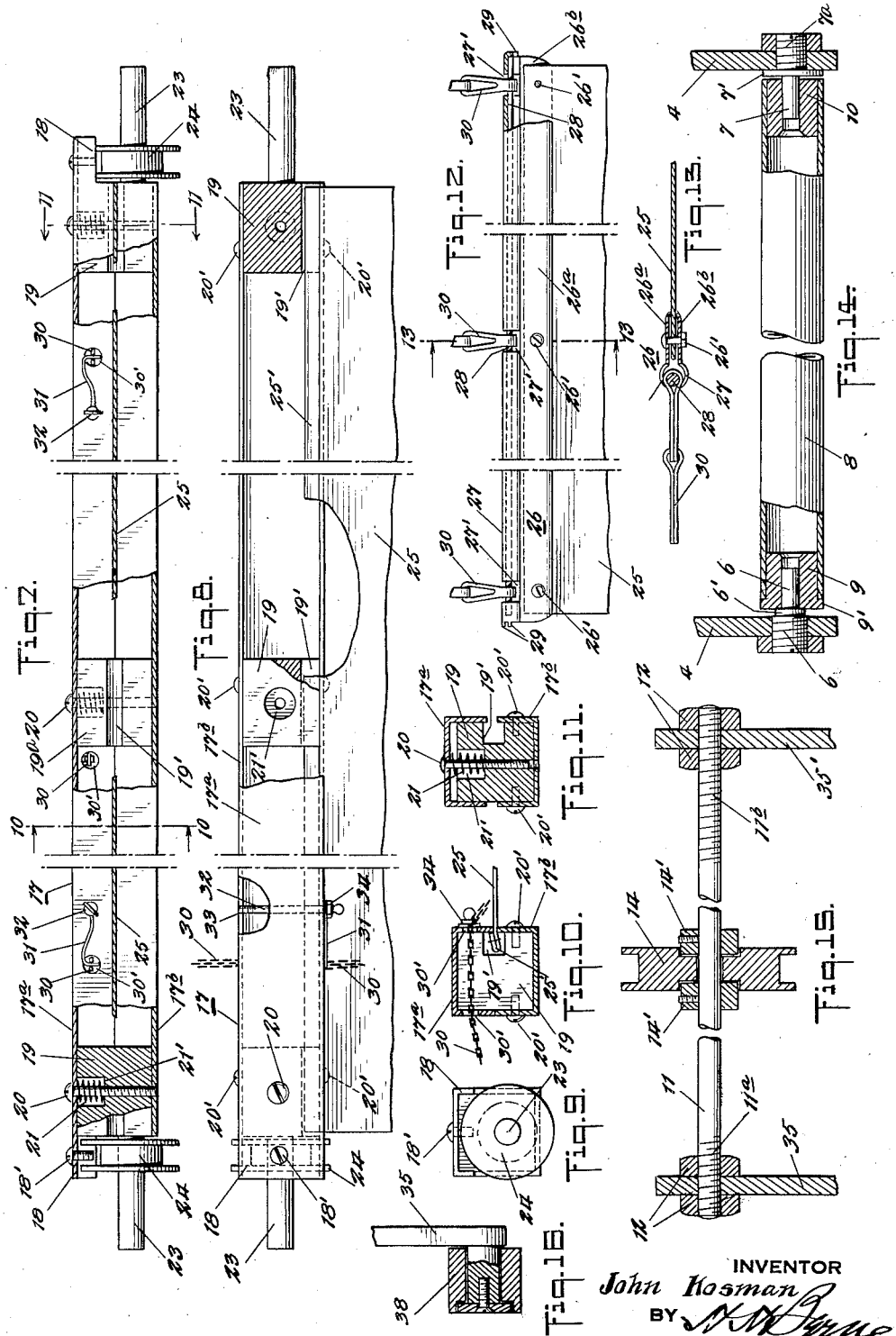

Patented Nov. 19, 1935

2,021,257

UNITED STATES PATENT OFFICE 2,021,257

BELT CONVEYER FOR OVENS

John Kosman, Brooklyn, N. Y., assignor to Geo. F. Stuhmer & Company, New York, N. Y., a corporation of New York Application August 28, 1933, Serial No. 687,189

16 Claims. (Cl. 107—56)

This invention relates to charging and removing devices for bakers' ovens, and more particularly to a novel apparatus for loading such devices or draw plates with the articles to be baked.

To attain the foregoing and other objects, the nature of which will appear as the description proceeds, the invention comprehends an apparatus adapted to be loaded with loaves of dough at a dough molding machine, adapted to be moved to an oven to receive the draw plates as they are withdrawn from the baking chambers of the oven, and adapted to deposit the loaves of dough in properly spaced relation on the draw plates while the latter are being returned to the baking chambers.

The invention further comprehends an apparatus of the character stated which will embody trays to be loaded with loaves of dough at the molding machine, a truck for carrying the trays from the molding machine to the oven and for receiving the draw plates beneath the trays as the draw plates are withdrawn from the baking chambers, and means operable by the draw plates while being returned to the baking chambers to successively move the loaves from the trays to the draw plates.

The invention further comprehends an apparatus of the character stated wherein the trays will each embody a loaf carrying apron resting upon the bottom of a trough and extending from the rear end of the trough to and over a roller at the front end of the trough, a bar having the rear end of the apron secured thereto and mounted upon the trough for movement from the rear end to the front end of the trough, and flexible members located below the trough and connected to the front end of the apron and to the bar and passing about sheaves at the rear end of the trough; the bar being adapted to be moved by the draw plate while the latter is being inserted in a baking chamber; and the movement of the bar drawing the apron forwardly on the tray to effect the displacement of the loaves from the apron onto a draw plate as the latter is being returned to the baking chamber.

The invention further comprehends an apparatus of the character stated wherein the draw plates will be provided with latches adapted to automatically engage the bars immediately after the draw plates have been completely withdrawn from the baking chambers, and wherein the trays will be provided with means adapted to automatically disengage the bars from the latches immediately before the draw plates have been completely inserted in the baking chambers.

The invention is hereinafter more fully described and claimed, and illustrated in the accompanying drawings, wherein:

Figure 1 is a top plan view of one of the trays;

Figure 2 is a sectional view taken on line 2—2 of Figure 1;

Figure 3 is a view partly in side elevation and partly in vertical section illustrating the apparatus in operative position before a baker's oven with one of the draw plates of the oven fully withdrawn from the oven and with another of the draw plates partly returned to the oven;

Figure 4 is a sectional view on an enlarged scale taken on the line 4—4 of Figure 3;

Figure 5 is a detail sectional view on an enlarged scale taken on the line 5—5 of Figure 3;

Figure 6 is a detail sectional view taken on the line 6—6 of Figure 3;

Figure 7 is a view partly in front elevation and partly in vertical section of one of the apron operating bars, a portion of the apron being shown;

Figure 8 is a view partly in top plan and partly in horizontal section of the bar with a fragmentary portion of the apron;

Figure 9 is a view in end elevation of the bar;

Figure 10 is a sectional view taken on the line 10—10 of Figure 7;

Figure 11 is a sectional view taken on the line 11—11 of Figure 7;

Figure 12 is a view illustrating the manner in which the flexible members are connected to the apron;

Figure 13 is a sectional view taken on the line 13—13 of Figure 12;

Figure 14 is a view partly in plan and partly in section illustrating the manner in which the front roller of the tray is mounted;

Figure 15 is a view partly in plan and partly in section illustrating the manner in which the sheaves for the flexible members are connected to their shaft, and Figure 16 is a sectional view of one of the supporting rollers for the tray.

Referring in detail to the drawings, and particularly to Figure 3, A designates a baker's oven, B the doors of the baking chambers of the oven, and C the draw plates of the baking chambers. The draw plates C, which are mounted on wheels D, are provided at their rear ends with upwardly directed lugs E which have openings F for the reception of the hooked ends of rods G through the medium of which the draw plates are withdrawn from and returned to the baking chambers.

The apparatus for loading the draw plates C with the articles to be baked comprises a plurality of trays H which, in practice, are loaded with loaves of dough at a dough molding machine, and a truck I on which the loaded trays are carried to the oven A, where the transfer of the loaves of dough from the trays to the draw plates C is effected.

Each of the trays H comprises, as best shown in Figures 1 and 3, a trough I consisting of a flat bottom 2, sides 5 and 5' extending above and below the bottom, and reinforcing crossbars 3 secured to the sides below the bottom. A roller 8 journaled in brackets 4 extending upwardly and forwardly from the front end of the trough 1 extends across the front end of the bottom 2 of the trough with its upper side in alinement with the upper side of the bottom. An apron 25 rests upon the bottom 2 of the trough 1, and extends from the rear end of the trough to and about the roller 8. The apron 25, which may be made from canvas or other suitable material, and upon which the loaves of dough are placed, is drawn forwardly on the trough 1 to effect the transfer of the loaves of dough from the tray 1 to one of the draw plates C. A bar 17 mounted upon the rear end of the trough 1 is connected directly to the rear end of the apron 25, and is connected by chains 30 to the front end of the apron. The chains 30 pass about sheaves 14 mounted upon a shaft 11 fixed in brackets 35, 35', and 35$^a$ extending rearwardly from the rear end of the tray 1. The bar 17 is supported by grooved wheels 24 for movement from the rear to the front end of the trough, to effect the forward movement of the apron 25.

The bar 17 comprises, as shown in Figures 7-11, upper and lower longitudinal sections 17$^a$ and 17$^b$, respectively, of channel formation and arranged with their channels in facing relation. The beaded rear end 25' of the apron 25 is clamped between the opposing edges of the front sides of the bar sections 17$^a$ and 17$^b$. The bar 17 is provided in its ends with blocks 19 and in its center with a block 19$^a$ which are secured by screws 20' to the lower bar section 17$^b$ and upon which the upper bar section 17$^a$ is mounted for adjustment upwardly and downwardly with relation to the lower bar section. The blocks 19 and 19$^a$ are provided in their front sides with recesses 19' for the reception of the beaded rear end 25' of the apron 25. The upper bar section 17$^a$ is moved away from the lower bar section 17$^b$ to permit the rear end of the apron 25 to be inserted between the bar sections, and the upper bar section is moved towards the lower bar section to clamp the rear end of the apron between the bar sections. Screws 20 passing freely through the top of the upper bar section 17$^a$, and engaging the blocks 19 and 19$^a$, provide means by which this bar section may be moved towards the lower bar section 17$^b$ and secured in apron clamping position with relation thereto. Spiral springs 21 sleeved on the screws 20 in recesses 21' formed in the blocks 19 and 19', and bearing against the bottom walls of the recesses and the lower side of the top of the upper bar section 17$^a$, function, when the screws 20 are turned back, to move this bar section out of clamping position with relation to the lower bar section 17$^b$, whereby to permit the rear end of the apron 25 to be inserted between or withdrawn from the bar sections.

The bar 17 is substantially equal in length to the width of the trough 1. Shafts 23 for the wheels 24 are secured to the end blocks 19 and extend beyond the sides of the trough 1. The upper bar section 17$^a$ is provided with extensions 18 which overlie the wheels 24 to prevent flour and dough from entering the grooves of the wheels. Screws 18' carried by the wheel guards 18 and extending into the grooves of the wheels 24, hold the wheels at the inner ends of the shafts 23. The wheels 24 engage the upper edge portions of the sides 5 and 5' of the trough 1, the sides serving as rails for the wheels, and the engagement of the wheels with the rails holding the bar 17 against lateral displacement from the trough.

A clamp 26 connecting the front end of the apron 25 to the chains 30, and substantially equal in length to the width of the apron, comprises jaws 26$^a$ and 26$^b$ connected by a split tube 27. The jaws 26$^a$ and 26$^b$ embrace the front end of the apron 25, and are held in clamping engagement with the apron by bolts 26'. The tube 27 is provided at its ends and center with notches 27' into which the front links of the chains 30 extend. A rod 28 located in the tube 27, and passing through the front links of the chains 30, secures the clamp and chains together. The tube 27 is provided at its ends with lugs 29 which contact with the ends of the rod 28 to maintain the rod within the tube.

The bar 17 and the clamp 26 are constructed as disclosed in order that the apron 25 may be readily secured thereto, and in order that the apron when worn may be readily replaced by a new one.

The chains 30 extend through openings 30' in the upper section 17$^a$ of the bar 17, and are secured to the bar by latches 31 which are located at the front side of this bar section and extend through those chain links nearest this side of the bar section. Screws 32 secure the latches 31 to the bar section 17$^a$. The screws 32 are turned up to hold the latches in engagement with the chains 30, and are turned back to free the latches for disengagement from the chains. When the latches 31 are disengaged from the chains 30, the latter may be drawn forwardly with relation to the bar 17 to take up any slack in the apron 25.

As shown in Figure 14, the means for rotatably supporting the roller 8 from the brackets 4 comprises shafts 6 and 7 fixed to the brackets and bushings 9 and 10 fixed in the ends of the roller. The shafts 6 and 7 have screw threaded heads 6$^a$ and 7$^a$ which pass through and are engaged with the brackets 4. The shafts 6 and 7 have shoulders 6' and 7' which contact with the outer ends of the bushings 9 and 10 to prevent flour from entering the roller and bushings.

The shaft 11 is, as shown in Figure 15, provided with screw threaded end portions 11$^a$ and 11$^b$ which pass through and are engaged with the brackets 35 and 35'. The screw threaded end portion 11$^b$ is longer than the screw threaded end portion 11$^a$, so as to permit the shaft 11 to be applied to the brackets 35 and 35' by being first engaged with the brackets 35' and by thereafter being engaged with the bracket 35, in a manner well understood. The shaft 11 is secured against any accidental movement with relation to the brackets 35 and 35' by nuts 12 engaged with the shaft and contacting with the brackets.

The sheaves 14 are held against movement lengthwise of the shaft 11 by collars 14'. A pair of the collars 14' is used in connection with each of the sheaves 14. The collars 14' have a snug fit on the shaft 11, and fit in recesses formed in the sides of the sheaves 14, to prevent flour from entering the bearing openings of the sheaves.

The tray H is supported on the truck I by arms 35$^a$ and 35$^b$ at the rear end of the tray, and by pins 42 and 42' at the front end of the tray. The arms 35 and 35$^a$ extend downwardly from the tray H, and are provided at their lower ends with rollers 38 and 38' which move along a pair of channeled rails 54 on the truck I while the tray is being placed in or removed from the truck. The pins 42 and 42' are carried by the brackets 4 at points higher than the tray H, and they extend laterally beyond the tray for engagement in recesses 53 formed in brackets 53' carried by the front uprights 52 of the truck I above the rails 54. The arms 35ª and 35ᵇ and the pins 42 and 42' support the tray H above the rails 54 for a distance sufficient to permit a draw plate C to be withdrawn from its baking chamber onto the rails beneath the tray. The pins 42 and 42', by reason of their engagement with the brackets 53', hold the tray H against accidental longitudinal movement on the rails 54, and the rails are provided with upwardly directed outer flanges 54' to hold the wheels 38 and 38' from lateral displacement from the rails.

The truck I has two pairs of the rails 54 arranged one above the other and carried by the front uprights 52 and rear uprights 52'. The front uprights are located at the outer sides of the rails 54 and slightly rearwardly of the front ends of the rails, leaving the front ends of the rails fully open, so as to permit the wheels of the tray to be readily engaged with the rails. The rear uprights 52' close the rear ends of the rails 54, so as to prevent the wheels of the tray from moving off the rails during the application of the tray to the truck. The truck is mounted on wheels, not shown, secured to the uprights 52 and 52'.

In practice, the trays H are loaded with loaves of dough at the dough molding machine, the loaves of dough being placed upon the aprons 25 which extend from the rear ends to the front ends of the trays. The manner in which the loaves of dough are arranged on the aprons 25 is shown by broken lines in Figure 3, wherein the loaves of dough are designated J. The loaded trays H are placed in the truck I and secured therein by engaging the pins 42 and 42' of the trays with the recessed brackets 53' of the truck. The truck I is moved from the dough molding machine to the oven A, and it is brought to rest with its front end facing the oven, and with the front ends 55 of its rails 54 engaging guides A' extending forwardly from the bottoms of the baking chambers of the oven. With the truck I in this position, the rails 54 are in substantial alinement with the bottoms of the baking chambers, whereby to permit the draw plates C to be withdrawn from the baking chambers onto the rails beneath the trays. The draw plates C are withdrawn from the baking chambers by the rods G. The brackets E of the draw plates C are provided with latches 56 having forwardly facing shoulders 57 for contact with the shafts 23 of the bars 17 during the final phase of the movement of the draw plates C from the baking chambers. The latches 56 are provided rearwardly of the shoulders 57 with cams 58 which, during the withdrawal of the draw plates C from the baking chambers, contact with the shafts 23 and lift the bar 17 high enough to permit the latches to pass rearwardly of the shafts. After the latches 56 pass the shafts 23, the bars 17 return to their normal position on the rails 5 and 5', in which position thereof the shafts will lie in front of the shoulders 57, with the result that the bars 17 will be engaged by the latches and moved forwardly on the troughs I while the draw plates are being returned to the baking chambers. This movement of the bars 17 will draw the aprons about the rollers forwardly of the troughs, causing the loaves of dough to be discharged successively from the trays onto the draw plates as the latter are returned to the baking chambers. Immediately before the draw plates are fully returned to the baking chambers, the wheels 24 of the bars 17 encounter the upwardly inclined front end portions 46 and 46' of the rails 5 and 5'. As the wheels travel up these inclined rail portions, the bars 17 are raised high enough to carry their shafts out of contact with the latches 56, whereby to disconnect the bars from the draw plates C.

After the draw plates C have been loaded and moved into the ovens, the truck I is moved back to the dough molding machine, and the trays H are removed from the truck to be again loaded after their bars 17 have been moved rearwardly to return the aprons 25 to their normal position, in which position they extend from the front end to the rear end of the trays. The trays H may be readily removed from the truck I after disengaging their pins 42 and 42' from the brackets 53' of the truck. The aprons 25 are used in preference to endless belts, for the reason that they are less likely to become clogged with dough and operate more efficiently than endless belts.

My conveying and charging device for bakers' ovens reduces the effort of labor required to load and unload, handle and use apparatus of this character during the process of bread making.

My invention further reduces the wear and tear, breakage and replacement of parts, as well as the saving of upkeep and maintenance, labor and materials in an apparatus of the nature described and subject to the necessary changes in conditions and temperatures during the bread making process.

What I claim is:

1. An apparatus for loading a draw plate of a baker's oven with articles to be baked, comprising a truck adapted to support the draw plate for insertion in the oven, a member on the truck above the draw plate, an apron mounted on said member adapted during movement thereof to successively deposit the articles on the draw plate while said plate is being inserted in the oven, a bar mounted on said member for forward movement thereon, means connecting the bar to the ends of the apron, means carried by the draw plate and engaging the bar whereby to effect the movement of the apron by the draw plate while said plate is being inserted in the oven, and means for disconnecting the bar from said first means immediately before the draw plate has been completely inserted in the oven.

2. An apparatus for loading a draw plate of a baker's oven with articles to be baked, comprising a truck adapted to receive the draw plate as it is withdrawn from the oven, a member on the truck beneath which the draw plate is received by the truck, an apron mounted on said member adapted to successively deposit the articles on the draw plate while said plate is being returned to the oven, a bar mounted on said member for forward movement thereon and for upward movement with relation thereto, means connecting the bar to the ends of the apron, latches carried by the rear end of the draw plate and having forwardly facing shoulders and rearwardly facing cams, said cams being adapted during the withdrawal of the draw plate from the oven to contact with the ends of the bar to lift it and position said ends in advance of said shoulders whereby to connect the draw plate with the bar while said plate is being returned to the oven, and means for lifting the bar to disengage its ends from said shoulders immediately before the bar is completely returned to the oven.

3. An apparatus for loading a draw plate with the articles to be baked, including a trough consisting of a bottom and rails at the sides of the bottom, an apron resting upon the bottom of the trough and extending from the rear end to the front end thereof, a bar having wheels engaging the rails, a roller at the front of the trough about which the front end of the apron passes, sheaves at the rear end of the trough, and flexible members connected to the front end of the apron and to the bar and passing about the sheaves.

4. In an apparatus according to claim 3, the bar comprising lower and upper sections between which the rear end of the apron is positioned, and means for releasably securing the sections in clamping engagement with the apron.

5. In an apparatus according to claim 3, the bar comprising upper and lower hollow sections between the front sides of which the rear end of the apron is positioned, blocks secured in and to the lower section, screws passing freely through the upper section and engaging the blocks, and springs carried by the blocks and bearing against the upper section.

6. In an apparatus according to claim 3, the bar being provided at its ends with shafts for the wheels, guards on the ends of the bar overlying the wheels, and elements carried by the guards and engaging the wheels to hold them against movement longitudinally of the shafts.

7. In an apparatus according to claim 3, the bar having openings through which the flexible members pass, and elements carried by the bar and releasably engaged with the elements to secure them to the bar.

8. In an apparatus according to claim 3, brackets secured to the front end of the trough, shafts carried by the brackets, bushings carried by the ends of the roller and receiving the shafts, shoulders on the shafts contacting with the ends of the bushings, and shoulders on the bushings contacting with the ends of the roller.

9. In an apparatus according to claim 3, brackets secured to the rear end of the trough, a shaft carried by the brackets for supporting the sheaves, the sheaves being provided in their sides with recesses, and collars secured to the shafts and entering said recesses.

10. An apparatus for loading the draw plate of an oven with articles to be baked, comprising a truck having a pair of rails to support the draw plate for insertion in the oven, recessed brackets at the front end of the trough above the rails, a trough on the truck above the draw plate, arms extending downwardly from the rear end of the trough and provided with wheels bearing on the rails, brackets extending upwardly from the front end of the trough and carrying pins engaged in the recesses of said first brackets, said arms and pins removably mounting the trough on the truck and supporting it above the draw plate, means on the trough carrying the articles and operable to deposit the articles on the draw plate while the latter is being inserted in the oven, and means connecting the draw plate to said first means to effect its operation by the draw plate while it is being returned to the oven.

11. In an apparatus according to claim 3, a clamp secured to the front end of the apron and including a tube provided with notches receiving the front ends of the flexible members, a rod carried by the tube and engaging said ends of the flexible members, and lugs carried by the ends of the tube and contacting with the ends of the rod.

12. In an apparatus according to claim 2, the apron supporting member being provided with rails having upwardly inclined end portions, shafts on the ends of the bar to be engaged by the latch cams to lift the bar to position the shafts in front of the latch shoulders, and wheels on the shafts mounted on the rails and adapted when moving on the inclined front ends of the rails to raise the bar to lift the shafts out of contact with the latch shoulders.

13. An apparatus for loading the draw plate of an oven with articles to be baked, comprising a truck adapted to support the draw plate when removed from the oven, an apron carrier cooperable with the draw plate, an apron mounted on said carrier adapted to support the articles and successively deposit the same on the draw plate while said plate is being moved into the oven, a roller on said carrier about which the apron passes while being moved, sheaves mounted at the rear end of said carrier, a crossbar movably mounted on said carrier and connected to the rear end of the apron, flexible elements connected to the front end of the apron and to the crossbar and passing about the sheaves, devices connecting the draw plate and crossbar to effect movement of the apron by the draw plate while said plate is moving into the oven, and means for automatically releasing the apron crossbar from the draw plate when said draw plate is returned to the oven.

14. In oven equipment of the character described, the combination of a portable rack, a carriage mounted on the rack and adapted to receive an oven draw plate, an apron dough carrier mounted to reciprocate on the carriage and deliver articles to the oven draw plate, chain lengths connecting the respective ends of the dough carrier apron, and means for automatically disconnecting the apron dough carrier from the oven draw plate, substantially as set forth.

15. In oven equipment of the character described, the combination of a portable rack, a carriage mounted thereon, an apron carrier reciprocally mounted on the carriage and adapted to receive thereunder the draw plate of an oven, a device for automatically connecting the apron carrier with the withdrawn oven draw plate, said apron carrier adapted to automatically discharge the dough pieces onto the draw plate while the draw plate is being returned to the oven, and a device for automatically disconnecting the engagement between the apron carrier and the oven draw plate when the draw plate has been returned to the oven.

16. In oven equipment of the character described, the combination of a portable rack, a carriage mounted thereon, an apron carrier-bar reciprocally mounted on the carriage, an apron connected to be actuated by said carrier-bar, said apron adapted to receive thereunder the draw plate of an oven, a device for connecting the carrier-bar with the withdrawn oven draw plate, said apron adapted to discharge the dough pieces onto the draw plate while the draw plate is being returned to the oven, and a device for automatically disconnecting the engagement between the carrier-bar and the oven draw plate when the draw plate has been returned to the oven.

JOHN KOSMAN.